United States Patent
Peters et al.

(10) Patent No.: US 11,426,916 B2
(45) Date of Patent: *Aug. 30, 2022

(54) METHODS FOR DISPENSING AND ADHERING HOT MELT ENTRAINED POLYMERS TO SUBSTRATES

(71) Applicant: CSP TECHNOLOGIES, INC., Auburn, AL (US)

(72) Inventors: Gary Peters, Auburn, AL (US); Jonathan R. Freedman, Auburn, AL (US); Franklin Lee Lucas, Jr., Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 335 days.

This patent is subject to a terminal disclaimer.

(21) Appl. No.: 16/490,773

(22) PCT Filed: Mar. 5, 2018

(86) PCT No.: PCT/US2018/020978
§ 371 (c)(1),
(2) Date: Sep. 3, 2019

(87) PCT Pub. No.: WO2018/161091
PCT Pub. Date: Sep. 7, 2018

(65) Prior Publication Data
US 2020/0001512 A1    Jan. 2, 2020

Related U.S. Application Data

(60) Provisional application No. 62/466,435, filed on Mar. 3, 2017.

(51) Int. Cl.
*B29C 48/154*    (2019.01)
*B29C 48/00*    (2019.01)
(Continued)

(52) U.S. Cl.
CPC ............ *B29C 48/154* (2019.02); *B05D 1/265* (2013.01); *B29C 48/0021* (2019.02);
(Continued)

(58) Field of Classification Search
CPC ....... B29C 48/154; B29C 48/05; B29C 48/07; B29C 48/02; B29C 48/155; B29C 48/91;
(Continued)

(56) References Cited

U.S. PATENT DOCUMENTS 3,826,602 A * 7/1974 Shaffer .................... F16L 3/015
425/378.1
5,911,937 A 6/1999 Hekal
(Continued)

FOREIGN PATENT DOCUMENTS

| CN | 1832812 A | 9/2006 |
|---|---|---|
| CN | 105073876 A | 11/2015 |

(Continued)

OTHER PUBLICATIONS

International Search Report for PCT/US2018/049578 dated Feb. 4, 2019.

*Primary Examiner* — Jacob T Minskey
*Assistant Examiner* — S. Behrooz Ghorishi
(74) *Attorney, Agent, or Firm* — David B. Gornish; Eckert Seamans Cherin & Mellott, LLC

(57) ABSTRACT

Disclosed are methods for forming and adhering an entrained polymer structure to a substrate. The methods include providing a substrate (114) configured to receive application of a molten entrained polymer (118). A mineral entrained polymer in molten form is applied in a predetermined shape, to a surface of the substrate, to form a solidified entrained polymer structure on the substrate. The entrained polymer includes a monolithic material formed of at least a base polymer (25) and a mineral active agent (30)

(Continued)

to absorb excess moisture. The surface of the substrate is compatible with the molten entrained polymer so as to thermally bond with it. In this way, the entrained polymer bonds to the substrate and solidifies upon sufficient cooling of the entrained polymer. The polymer can have a channeling or foaming agent (35), eg polyglycol. To apply the polymer is provided a hot melt dispensing apparatus comprising: a feeder (102) (optionally an extruder or loader) for providing a flow of mineral entrained polymer in molten form; one or more hoses (104), each of which having an internal lumen in fluid communication with an exit (106) of the feeder to receive flow of the mineral entrained polymer in molten form, the lumen terminating at an applicator (110) to which the entrained polymer in molten form is conveyed; the applicator comprising a dispenser (112) for applying the entrained polymer in the predetermined shape to the surface of the substrate. The hose and the dispenser can be heated.

21 Claims, 3 Drawing Sheets

(51) Int. Cl.
| | | |
|---|---|---|
| *B29C 48/14* | (2019.01) | |
| *B29C 48/86* | (2019.01) | |
| *B29C 48/08* | (2019.01) | |
| *B29C 48/255* | (2019.01) | |
| *B29C 48/25* | (2019.01) | |
| *B29C 48/21* | (2019.01) | |
| *B05D 1/26* | (2006.01) | |
| *B29C 65/02* | (2006.01) | |
| *B32B 37/15* | (2006.01) | |
| *B29C 48/05* | (2019.01) | |
| *B29C 48/07* | (2019.01) | |
| *B29C 48/02* | (2019.01) | |
| *B29C 48/155* | (2019.01) | |
| *B29C 48/91* | (2019.01) | |
| *B65D 75/36* | (2006.01) | |
| *C08L 23/06* | (2006.01) | |
| *C08L 23/12* | (2006.01) | |
| *B29C 70/88* | (2006.01) | |
| *B29K 103/08* | (2006.01) | |
| *B29K 105/00* | (2006.01) | |
| *B29L 31/00* | (2006.01) | |
| *B65D 65/00* | (2006.01) | |
| *B29K 23/00* | (2006.01) | |

(52) U.S. Cl.
CPC .......... *B29C 48/02* (2019.02); *B29C 48/022* (2019.02); *B29C 48/05* (2019.02); *B29C 48/07* (2019.02); *B29C 48/08* (2019.02); *B29C 48/1472* (2019.02); *B29C 48/1476* (2019.02); *B29C 48/155* (2019.02); *B29C 48/21* (2019.02); *B29C 48/2556* (2019.02); *B29C 48/266* (2019.02); *B29C 48/865* (2019.02); *B29C 48/91* (2019.02); *B29C 65/02* (2013.01); *B32B 37/153* (2013.01); *B65D 75/36* (2013.01); *C08L 23/06* (2013.01); *C08L 23/12* (2013.01); *B05D 2252/04* (2013.01); *B05D 2401/30* (2013.01); *B29C 70/88* (2013.01); *B29K 2023/0633* (2013.01); *B29K 2023/12* (2013.01); *B29K 2103/08* (2013.01); *B29K 2105/0097* (2013.01); *B29L 2031/712* (2013.01); *B32B 2439/80* (2013.01); *B65D 65/00* (2013.01)

(58) Field of Classification Search
CPC . B29C 48/022; B29C 48/1472; B29C 48/865; B29C 48/08; B29C 48/2556; B29C 48/266; B29C 48/21; B29C 48/1476; B29C 48/0021; B29C 65/02; B29C 70/88; B29C 48/03; B65D 75/36; B65D 65/00; C08L 23/06; C08L 23/12; C08L 23/00; C08L 91/06; C08L 23/26; B32B 37/153; B32B 2439/80; B29K 2023/0633; B29K 2023/12; B29K 2103/08; B29K 2105/0097; B29L 2031/712; C08K 5/20; C08K 5/10; B05D 1/265; B05D 2252/04; B05D 2401/30
See application file for complete search history.

(56) References Cited

U.S. PATENT DOCUMENTS

| | | | |
|---|---|---|---|
| 6,063,503 | A | 5/2000 | Hatakeyama et al. |
| 6,080,350 | A | 6/2000 | Hekal |
| 6,124,006 | A | 9/2000 | Hekal |
| 6,130,263 | A | 10/2000 | Hekal |
| 6,194,079 | B1 | 2/2001 | Hekal |
| 6,214,255 | B1 | 10/2001 | Hekal |
| 6,486,231 | B1 | 11/2002 | Hekal |
| 7,005,459 | B2 | 2/2006 | Hekal |
| 7,476,416 | B2 | 1/2009 | Tynan, Jr. et al. |
| 8,142,603 | B2 | 3/2012 | Sagona et al. |
| 9,902,788 | B2 | 2/2018 | Klein et al. |
| 2001/0000971 | A1 | 7/2001 | Sinsel et al. |
| 2001/0009718 | A1 | 7/2001 | Sinsel et al. |
| 2002/0168532 | A1* | 11/2002 | Sinsel ............. B32B 38/0008 428/461 |
| 2008/0283184 | A1* | 11/2008 | Sagona ............ B65B 61/20 156/256 |
| 2014/0287174 | A1 | 9/2014 | Klein et al. |
| 2016/0039955 | A1* | 2/2016 | Klein .............. B01J 20/28026 525/184 |
| 2018/0312667 | A1 | 11/2018 | Colgrove et al. |

FOREIGN PATENT DOCUMENTS

| | | | | |
|---|---|---|---|---|
| GB | 1 282 876 | | 7/1972 | |
| JP | H09-085830 A | | 3/1997 | |
| JP | H09-234832 A | | 9/1997 | |
| JP | 2002-206046 A | | 7/2002 | |
| JP | 2002206046 A | * | 7/2002 | ............ B29C 48/92 |
| JP | 2006-327690 A | | 12/2006 | |
| JP | 2010274662 A | | 12/2010 | |
| JP | 2014-050988 A | | 3/2014 | |
| JP | 2016-513748 A | | 5/2016 | |
| WO | 0009848 A2 | | 2/2000 | |
| WO | 03/033237 A1 | | 4/2003 | |
| WO | 2005/049750 A2 | | 6/2005 | |
| WO | 2010/002764 A1 | | 1/2010 | |
| WO | 2018/089933 A1 | | 5/2018 | |

* cited by examiner

METHODS FOR DISPENSING AND ADHERING HOT MELT ENTRAINED POLYMERS TO SUBSTRATES

CROSS-REFERENCE TO RELATED APPLICATIONS

This application is a U.S. National Phase of International Application No. PCT/US2018/020978 filed Mar. 5, 2018, which claims priority to U.S. Provisional Patent Application No. 62/466,435 filed Mar. 3, 2017, which are each incorporated herein by reference in their entireties.

BACKGROUND OF THE INVENTION

1. Field of Invention

This disclosure relates to methods for extruding a hot melt adhesive comprising an entrained polymer, optionally in an in-line production process. More particularly, the disclosed concept relates to applying and adhering molten active polymer formulations to a substrate having a surface. The surface includes a material compatible with the molten active polymer formulation so as to facilitate a thermal bond thereto.

2. Description of Related Art

There are many items that are preferably stored, shipped and/or utilized in an environment that must be controlled and/or regulated. For example, in the moisture control field, containers and/or packages having the ability to absorb excess moisture trapped therein have been recognized as desirable. The control of moisture, oxygen, ethylene and other gaseous substances may be desirable in medical, electronics and food packaging applications.

Conventionally, desiccants, oxygen absorbers and other active agents have been used in raw form, e.g., as loose particulates housed in sachets or canisters within packaging, to control the internal environment of the package. For many applications, it is not desired to have such loosely stored active substances. To address this problem, the assignee of the present application had developed active entrained polymers comprising active agents, wherein such polymers can be extruded and/or molded into desired forms, e.g., container liners, plugs, film sheets, pellets and other such structures. Optionally, such active entrained polymers may include channeling agents, such as polyethylene glycol (PEG), which form channels between the surface of the entrained polymer and its interior to transmit a selected material (e.g., moisture) to the entrained active agent (e.g., desiccant to absorb the moisture). Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth.

For some packages, e.g., pouches or blister packs, it is desired to adhere an entrained polymer film or layer to a substrate (e.g., another polymer or a foil) to form the package. One way to do so is by applying an adhesive to the film or layer during production to adhere it to the substrate. This may not be desirable because it requires a step of applying a separate adhesive and the adhesive may include solvents that can be deleterious to the package contents. An alternative is through a heat staking method which does not require application of a separate adhesive to adhere the entrained polymer film or layer to the substrate. As described in U.S. Pat. No. 8,142,603, which is incorporated by reference herein in its entirety, the heat staking method comprises the steps of: heating a foil substrate; applying an entrained polymer film to the foil; and applying sufficient pressure to the film and foil combination and sufficient heat to the foil so that the film adheres to the foil.

Heat staking is an improvement over use of conventional adhesives to adhere entrained polymer film to a substrate. However, in large scale production, heat staking typically requires providing formed film in bulk and applying a cutting step or providing pre-cut film. This may not always be desired by a package manufacturer, labeler or filler. There is a need for in-line production methods for applying and adhering a formed entrained polymer to a substrate without having to provide the entrained polymer in a preformed or precut shape. Ideally, the method would not require use of a separate adhesive material to adhere the entrained polymer to the substrate.

BRIEF SUMMARY OF THE INVENTION

Accordingly, in one aspect, a method is provided for forming and adhering an entrained polymer structure to a substrate. The method includes providing a substrate configured to receive application of a molten entrained polymer. A mineral entrained polymer in molten form is applied in a predetermined shape, to a surface of the substrate, to form a solidified entrained polymer structure on the substrate. The entrained polymer includes a monolithic material formed of at least a base polymer and a mineral active agent. The surface of the substrate is compatible with the molten entrained polymer so as to thermally bond with it. In this way, the entrained polymer bonds to the substrate and solidifies upon sufficient cooling of the entrained polymer. Preferably, the solidified entrained polymer structure adheres to the substrate without use of a separate adhesive material.

Optionally, in any embodiment, the entrained polymer is a two phase formulation.

Optionally, in any embodiment, the entrained polymer is a three phase formulation.

Optionally, in any embodiment, the substrate is a foil and the surface of the substrate is a polymer sealing layer on the foil.

Optionally, in any embodiment, the method is carried out using a hot melt dispensing apparatus. The apparatus includes a feeder for providing a flow of mineral entrained polymer in molten form. The feeder is optionally an extruder. The apparatus further includes one or more hoses, each of which having an internal lumen in fluid communication with an exit of the feeder to receive flow of the mineral entrained polymer in molten form. The lumen terminates at an applicator to which the entrained polymer in molten form is conveyed. The applicator includes a dispenser for applying the entrained polymer in the predetermined shape to the surface of the substrate.

Optionally, in any embodiment, the lumen is heated to maintain a molten state of the entrained polymer when conveyed through the lumen.

Optionally, in any embodiment, the dispenser is heated to maintain a molten state of the entrained polymer and to facilitate precise formation of the entrained polymer into the predetermined shape.

Optionally, in any embodiment, the dispenser includes a valve that alternates between a closed state and an open state so as to precisely form the entrained polymer structure in the predetermined shape.

Optionally, in any embodiment, the mineral active agent is a granular material that is more abrasive than the base polymer.

Optionally, in any embodiment, the active agent is a desiccant, optionally a molecular sieve, a silica gel, a clay, or another desiccant that is a granular material that is more abrasive than the base polymer.

Optionally, in any embodiment, one or both of the substrate and solidified entrained polymer structure are flexible materials.

Optionally, in any embodiment, solid entrained polymer pellets are provided into the feeder and melted to form the entrained polymer in molten form.

Optionally, in any embodiment, the solidified entrained polymer structure is in the form of: a sheet, a film, a bead, a dot, a strip or a swirl.

Optionally, in any embodiment, the solidified entrained polymer structure is in the form of a film having a thickness of from 0.1 mm to 1.0 mm, optionally from 0.2 mm to 0.8 mm, optionally from 0.3 mm to 0.7 mm Optionally, if the substrate is a foil, the surface of the substrate is a polymer sealing layer on the foil, and the substrate is a portion of a package for a moisture-sensitive product, optionally wherein the package is a flexible package, a pouch or a blister pack.

Optionally, in any embodiment, the method is carried out as part of an automated, in-line package production process.

Optionally, in any embodiment, the solidified entrained polymer structure adheres to the substrate without use of a separate adhesive material.

Optionally, in any embodiment, the active agent is from 30% to 80%, optionally from 30% to 75%, optionally from 30% to 70%, optionally from 35% to 70%, optionally from 40% to 65%, optionally from 45% to 55%, by weight of the entrained polymer.

Optionally, in any embodiment, a composite is made according to methods disclosed herein. The composite includes the substrate and the solidified entrained polymer structure adhered thereto. Optionally, in any embodiment, the composite is a portion of a flexible package, pouch or blister pack.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Definitions

Figure 1:
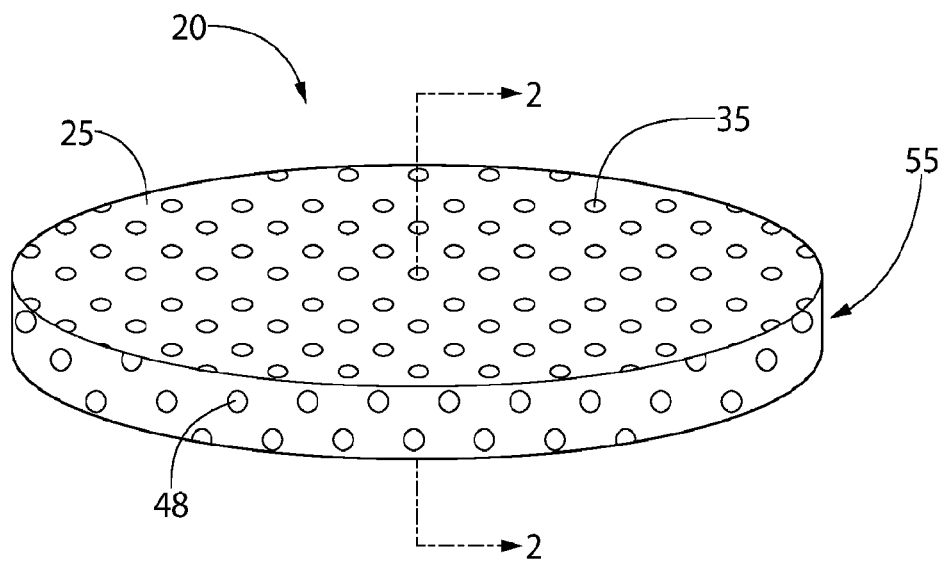
FIG. 1 is a perspective view of a plug formed of an entrained polymer that may be deposited onto a substrate according to methods of the disclosed concept.

As used herein, the term "active" is defined as capable of acting on, interacting with or reacting with a selected material (e.g., moisture or oxygen) according to the disclosed concept. Examples of such actions or interactions may include absorption, adsorption or release of the selected material.

As used herein, the term "active agent" is defined as a material that (1) is immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb or release the selected material(s). Active agents according to the disclosed concept may be in the form of mineral particles, but (unless otherwise claimed) the invention should not be viewed as limited to mineral particulate active agents. Nevertheless, the disclosed concept is particularly suited for entrained polymers formed with an active agent that is mineral in form, for example molecular sieve or silica gel.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. An entrained polymer having an active agent that is mineral in form is referred to herein as a "mineral entrained polymer".

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon, by, or interacts or reacts with an active agent and is capable of being transmitted through the channels of the entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent. In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition that may be used according to the disclosed concept would be an entrained polymer formed of a base polymer, active agent, and channeling agent. Optionally, a three phase composition or structure may include an additional phase, e.g., a colorant.

Entrained Polymers Suitable for Methods According to the Disclosed Concept

FIGS. 1-6 illustrate entrained polymers 10 and various packaging assemblies formed of entrained polymers according to the disclosed concept. The entrained polymers 10 each include a base polymer 25, a channeling agent 35 and an active agent 30. As shown, the channeling agent 35 forms interconnecting channels 45 through the entrained polymer 10. At least some of the active agent 30 is contained within these channels 45, such that the channels 45 communicate between the active agent 30 and the exterior of the entrained polymer 10 via channel openings 48 formed at outer surfaces of the entrained polymer 25. The active agent 30 can be, for example, any one of a variety of absorbing, adsorbing or releasing materials, as described in further detail below.

While a channeling agent, e.g., 35, is preferred, the disclosed concept broadly includes entrained polymers that optionally do not include channeling agents.

Suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent 35 can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Figure 4:
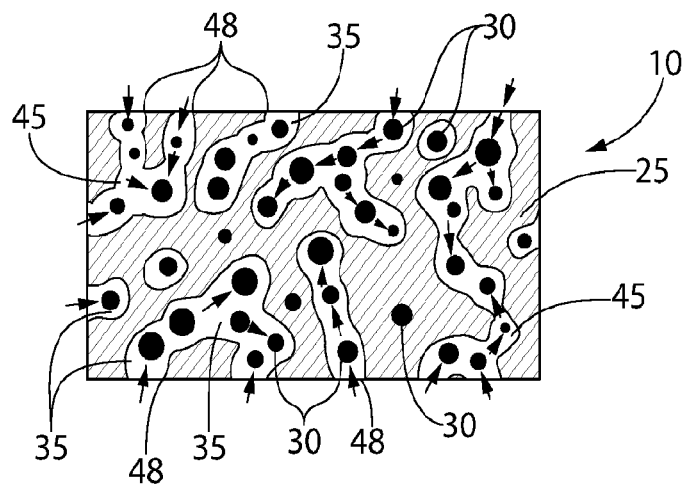
FIG. 4 is a schematic illustration of an entrained polymer that may be used according to methods of the disclosed concept, in which the active agent is an absorbing or adsorbing material.

Suitable active agents according to the disclosed concept include absorbing materials, such as desiccating compounds. FIG. 4 illustrates an embodiment of an entrained polymer 10 according to the disclosed concept, in which the active agent 30 is an absorbing or adsorbing material. The arrows indicate the path of the selected material, for example moisture or gas, from an exterior of the entrained polymer 10, through the channels 45, to the particles of active agent 30, which absorb or adsorb the selected material.

If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger.

Suitable absorbing materials may also include: (1) metals and alloys such as, but not limited to, nickel, copper, aluminum, silicon, solder, silver, gold; (2) metal-plated particulates such as silver-plated copper, silver-placed nickel, silver-plated glass microspheres; (3) inorganics such as $BaTiO_3$, $SrTiO_3$, $SiO_2$, $Al_2O_3$, $ZnO$, $TiO_2$, $MnO$, $CuO$, $Sb_2O_3$, $WC$, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; (5) elastomers, such as polybutadiene, polysiloxane, and semi-metals, ceramic and; (6) other fillers and pigments.

In another example, the absorbing material may be a carbon dioxide scavenger, such as calcium oxide. In the presence of moisture and carbon dioxide, the calcium oxide is converted to calcium carbonate. Accordingly, calcium oxide may be used as the absorbing material in applications where absorption of carbon dioxide is needed. Such applications include preserving fresh foods (e.g., fruits and vegetables) that give off carbon dioxide.

Other suitable active agents according to the disclosed concept include releasing materials. Such materials may comprise any suitable material that will release the selected material from the releasing material. The selected material released from the releasing material could be in the form of a solid, gel, liquid or gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents.

Suitable biocides for use as releasing materials in the entrained polymers of the disclosed concept may include, but are not limited to, pesticides, herbicides, nematacides, fungicides, rodenticides and/or mixtures thereof. In addition to the biocides, the covering of the disclosed concept can also release nutrients, plant growth regulators, pheromones, defoliants and/or mixture thereof.

Quaternary ammonium compounds can also be used as releasing materials according to the disclosed concept. Such compounds not only function as surfactants, but also impart to the surface of the entrained polymer aseptic properties or establish conditions for reducing the number of microbial organisms, some of which can be pathogenic. Numerous other antimicrobial agents, such as benzalkonium chloride and related types of compounds as hexachlorophene, may also be used as releasing agents according to the disclosed concept.

Other potential releasing materials include fragrances, including natural, essential oils and synthetic perfumes, and blends thereof. Typical perfumery materials which may form part of, or possibly the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources or manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived from such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

It is believed that the higher the active agent concentration in the mixture, the greater the absorption, adsorption or releasing capacity (as the case may be) will be of the final composition. However, too high an active agent concentration could cause the entrained polymer to be more brittle and the molten mixture of active agent, base polymer and channeling agent to be more difficult to either thermally form, extrude or injection mold. In one embodiment, the active agent loading level can range from 10% to 80%, preferably 40% to 70%, more preferably from 40% to 60%, and even more preferably from 45% to 55% by weight with respect to the total weight of the entrained polymer. Optionally, channeling agent may be provided in a range of 2% to 10% by weight, preferably about 5%. Optionally, the base polymer may range from 10% to 50% by weight of the total composition, preferably from 20% to 35% by weight. Optionally, a colorant is added, e.g., at about 2% by weight of the total composition.

Referring to FIG. 1, an insert 20, constructed from the entrained polymer according to an optional embodiment is illustrated. The insert 20 is in the form of a plug 55 that may be deposited into a container or other enclosure, or deposited onto a substrate (e.g., foil).

Figure 2:
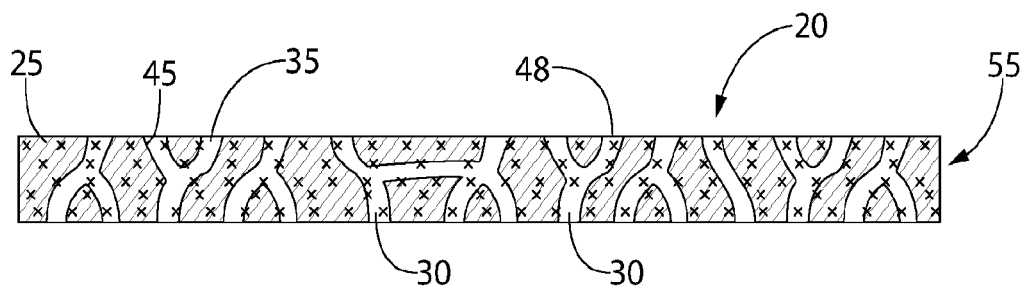
FIG. 2 is a cross section taken along line 2-2 of FIG. 1.

Referring to FIG. 2, a cross-sectional view is shown of the plug 55 that has been constructed from an entrained polymer 10 comprising the base polymer 25 that has been uniformly blended with the active agent 30 and the hydrophilic agent or channeling agent 35. In the illustration of FIG. 2, the entrained polymer has been solidified so that interconnecting channels 45 have formed throughout the entrained polymer 10 to establish passages throughout the solidified plug 55. As may be appreciated from both FIGS. 1 and 2, the passages terminate in channel openings 48 at exterior surfaces of the plug 55.

Figure 3:
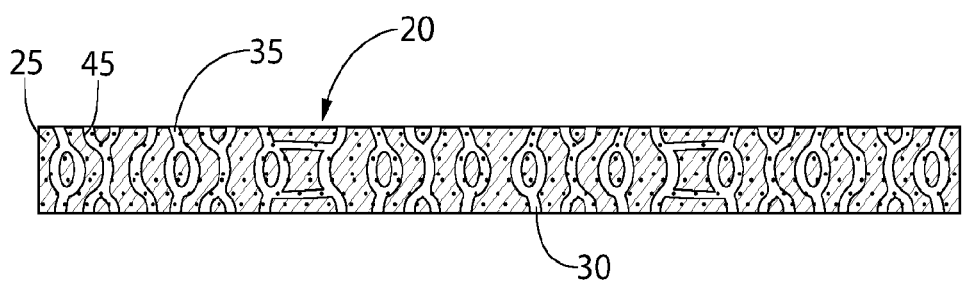
FIG. 3 is a cross section similar to that of FIG. 2, showing a plug formed of another embodiment of an entrained polymer that may be deposited onto a substrate according to methods of the disclosed concept.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer 10 having a dimer agent added thereto, the interconnecting channels 45 which are formed therethrough have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally resists permeation of these materials, thus acting as a barrier thereto. For this reason, the base polymer 25 itself acts as a barrier substance within which an active agent 30 may be entrained. The interconnecting channels 45 formed of the channeling agent 35 provide pathways for the desired material to move through the entrained polymer 10. Without these interconnecting channels 45, it is believed that relatively small quantities of the desired material would be transmitted through the base polymer 25 to or from the active agent 30. In the case in which the desired material is transmitted to the active agent 30, it may be absorbed by the active agent 30, for example in embodiments in which the active agent 30 is an active agent such as a desiccant or an oxygen absorber. In the case in which the desired material is transmitted from the active agent 30, it may be released from the active agent 30, for example in embodiments in which the active agent 30 is a releasing material, such as a fragrance or gas releasing material.

Figure 5:
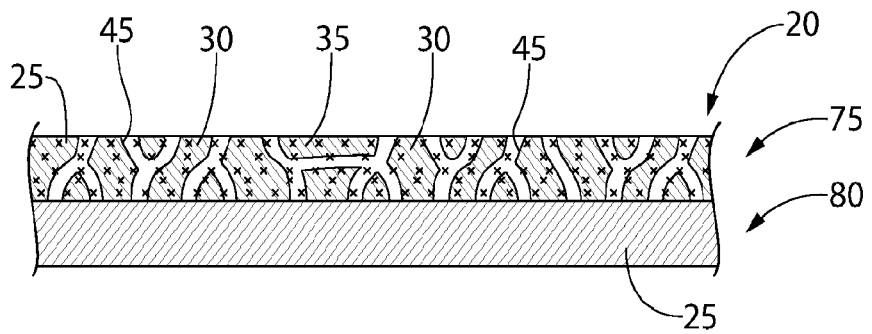
FIG. 5 is a cross sectional view of a sheet formed of an entrained polymer, adhered to a barrier sheet substrate according to methods of the disclosed concept.
Figure 6:
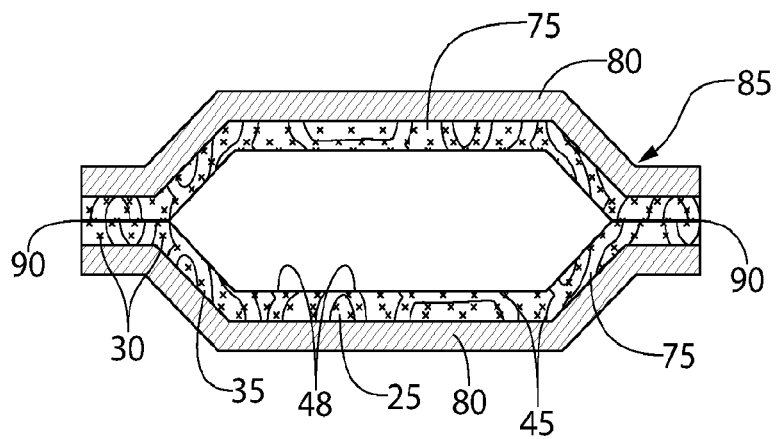
FIG. 6 is a cross section of a package that may be formed according to methods of the disclosed concept.

FIG. 5 illustrates embodiments of an end product of the method according to the disclosed concept. An active sheet 75 formed of the entrained polymer 10 of the invention is used in combination with a barrier sheet 80 to form a composite according to an aspect of the invention. The characteristics of the active sheet 75 are similar to those described with respect to the plug 55. The barrier sheet 80 may be a substrate such as foil and/or a polymer with low moisture or oxygen permeability. The substrate 80 is compatible with the active sheet 75 and is thus configured to thermally bond to the active sheet 75, when the active sheet solidifies after dispensing, as discussed below. FIG. 6 illustrates an embodiment in which the two sheets 75, 80 are combined to form a packaging wrap having active characteristics at an interior surface formed by the entrained polymer 10 active sheet 75, and vapor resistant characteristics at an exterior surface formed by the barrier sheet or substrate 80. Methods according to the disclosed concept for making the sheet 75 and adhering it to the substrate 80 are described below.

In one embodiment, the sheets of FIG. 5 are joined together to form an active package 85, as shown in FIG. 6. As shown, two laminates or composites are provided, each formed of an active sheet 75 joined with a barrier sheet 80. The sheet laminates are stacked, with the active sheets 75 facing one another, so as to be disposed on an interior of the package, and are joined at a sealing region 90, formed about a perimeter of the sealed region of the package interior.

Exemplary Methods According to Optional Aspects of Disclosed Concept

Methods for applying and adhering an entrained polymer structure to a suitable substrate according to aspects of the disclosed concept will now be described.

One of the difficulties in processing molten mineral entrained polymers, is providing a substantially consistent shear of the molten material conveyed through an extruder and thereafter maintaining the molten state of the material through the point of dispensing. This would not typically be problematic for a simple "one phase" polymer or a mixture of molten polymers. However, including a granular, abrasive mineral component in the formulation, such as a typical desiccant (e.g., molecular sieve or silica gel), introduces complexity to the process. Such granular mineral components interfere with achieving the consistent shear necessary to convey the entrained polymer through the extruder and to maintain it in a molten state when dispensed so as to apply the molten entrained polymer in a predetermined shape to a surface of a substrate to form thereon a solidified entrained polymer structure (e.g., film).

From the perspectives of material science and fluid mechanics, the viscosity of the entrained polymer is known to vary and decreases with increasing shear rate. This non-newtonian, pseudoplastic material creates challenges in mixing and handling as its thixotropic structure progressively breaks down on shearing and slowly rebuilds at rest. The term "thixotropic structure" is based on the following definition for "thixotropy": a term used in rheology which means that the viscosity of material decreases significantly with the time of shearing and then, increases significantly when the force introducing the flow is removed.

The inventors have found that a mineral entrained polymer cannot be processed using standard tank melting systems because no shear is introduced; rather, only heat is used in tank melting systems. With the absence of shear thinning, the high viscosity at low shear stress is too great and thus will not allow the material to flow/dispense as its thixotropic behavior wants to resist any flowing. A mineral entrained polymer compound in molten form requires constant pressure and shearing through an extruder for flowing to occur, which may be facilitated using a pressurized tank melting system. A pressurized tank melting system uses a pneumatic cylinder to push a plate against the polymer.

The inventors have discovered certain adaptations to single screw extruder equipment and to processes for using the same that overcome these difficulties. The extruder, as with typical extruders, provides for transport and melting of feed and pressure build-up of melted polymer for dispensing. Typically, an extruder includes a hollow chamber with heating zones and a threaded shaft or screw which rotates along its central axis. The extruder typically includes a hopper at one end, which provides for feeding of polymer material into the extruder, typically in the form of 2-10 mm sized solid pellets.

Figure 7:
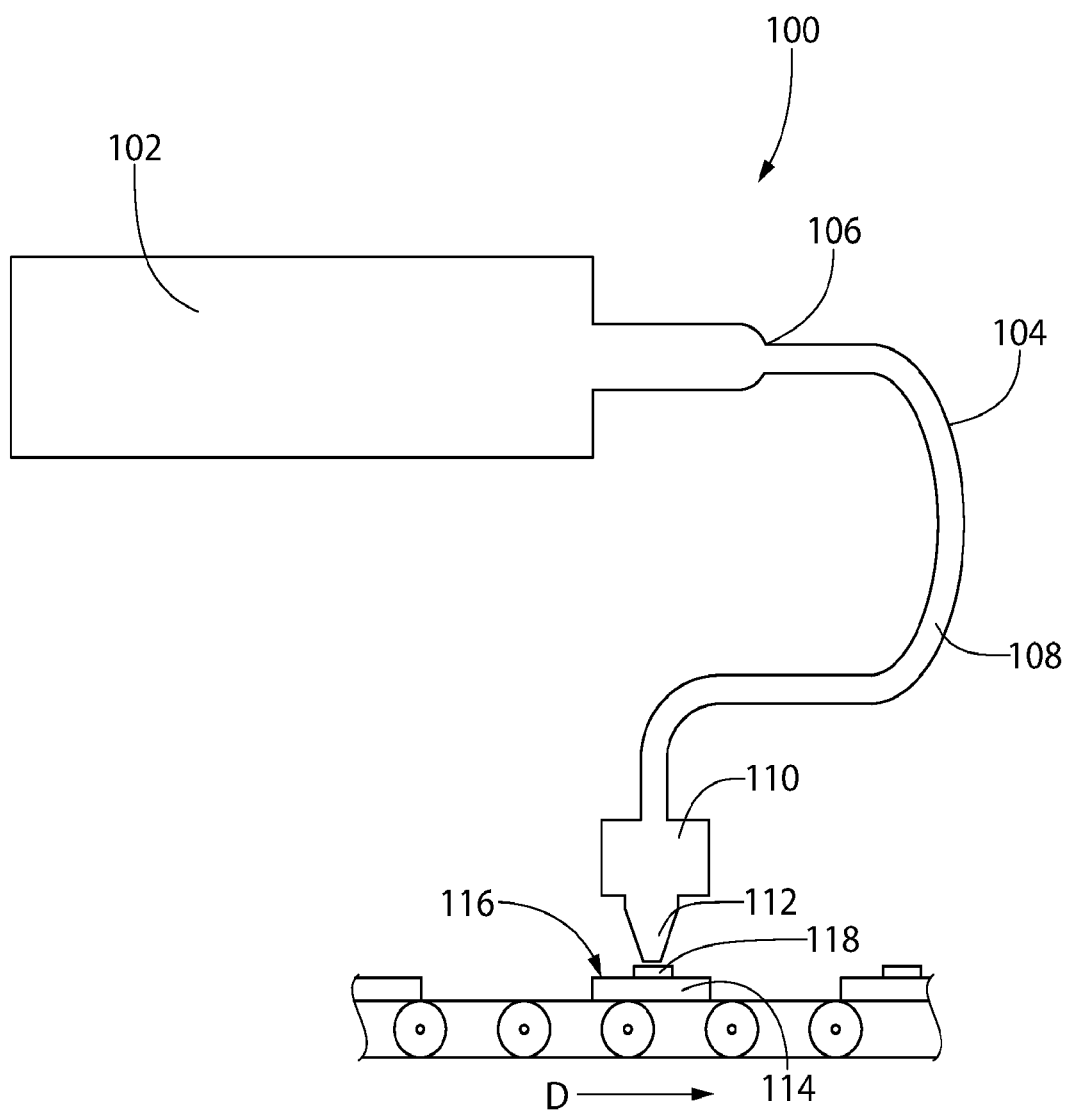
FIG. 7 is a schematic illustration of an optional embodiment of a hot melt dispensing apparatus delivering an entrained polymer in molten form to a substrate.

Referring now to FIG. 7, there is shown an optional embodiment of a hot melt dispensing apparatus 100 for carrying out methods for forming and adhering an entrained polymer structure to a substrate. The hot melt dispensing apparatus 100 includes a feeder 102 (optionally, an extruder or a loader) for providing a flow of mineral entrained polymer in molten form. The feeder 102 includes an exit 106 to which a hose 104 (optionally more than one hose) is coupled. The hose 104 includes an internal lumen 108 that is in fluid communication with the exit 106 to receive flow of the mineral entrained polymer in molten form. The lumen 108 terminates at an applicator 110 to which the entrained polymer in molten form is conveyed. The applicator 110 comprises a dispenser 112 configured to deliver the entrained polymer in molten form to a surface or enclosure in precise amounts and configurations (i.e., in a predetermined shape).

In the embodiment shown, the dispenser 112 has deposited a mineral entrained polymer in molten form to the surface 116 of a substrate 114, forming and adhering an entrained polymer structure 118 thereon. Optionally, the substrate 114 is a foil and the surface 116 is a polymer sealing layer (which is compatible with the base polymer of the mineral entrained polymer) to help effectuate a thermal bond between the structure 118 and the surface 116. The lumen 108 and/or the dispenser 112 (preferably both) are heated to maintain a molten state of the entrained polymer when conveyed from the feeder 102, through the lumen 108 and out the dispenser 112. Heating the dispenser 112 in this way also may help facilitate precise formation of the entrained polymer into the predetermined shape.

Optionally, the method using the apparatus 100 is carried out as part of an automated, in-line production process. To facilitate this, for example, a conveyor belt may transport units of substrate 114 for automated depositing of molten entrained polymer thereon. For example, the conveyor belt may move in direction D to transport the units of substrate 114 as part of the in-line process. The in-line process may be, for example, a package production process. The entrained polymer structure 118 and substrate 114 together form a composite, which may be a portion of a flexible package, pouch or blister pack, for example.

Optionally, the dispenser 112 comprises a valve that alternates between a closed state and an open state so as to precisely form the entrained polymer structure 118 in the predetermined shape. Optionally, the dispenser 112 comprises a hot melt precision slot-die extrusion coating head. This type of dispenser configuration may help ensure accurate heat distribution and stability, and provide precise repeatability. The entrained polymer compound will flow through a deposition nozzle of the dispenser because the applied shear thinning and pressure shears the bond and induces a breakdown in the material elasticity, therefore causing material to flow. The elasticity recovers immediately after leaving the nozzle and the entrained polymer solidifies to maintain its shape and strength. The result is a strip or other structure of a solidified entrained polymer that is configured to thermally bond to a compatible substrate.

Optionally, in any embodiment, a storage or material supply tank may be configured to store a pseudoplastic high viscosity material and supply the material (e.g., solid entrained polymer pellets) to a pump. The pump is configured to apply a force to the material by shear thinning the pseudoplastic high viscosity material to reduce material viscosity, thus causing the material to flow.

If an extruder is used to feed hot melt entrained polymer, means are required to position and dispense the material onto a substrate. This for example may be provided by a flexible or rigid hose that is connected to and in fluid communication with an exit of the extruder, as discussed above. The flexible hose includes a lumen through which the molten entrained polymer is conveyed, the lumen being heated preferably above the temperature of the polymer exiting the extruder. Such a high temperature is configured to prevent heat loss that could inhibit flow. The entrained polymer compound may flow through a deposition nozzle because the applied shear thinning and pressure shears the bond and induces a breakdown in the material elasticity therefore causing material to flow. The elasticity recovers immediately after leaving the nozzle and the entrained polymer solidifies to maintain its shape and strength. The result is a strip or other structure of a solidified entrained polymer that is configured to thermally bond to a compatible substrate.

Optionally, in any embodiment, the lumen 108 of the hose 104 that is in contact with the molten entrained polymer is heated to a temperature above that of the material exiting the extruder. Optionally, in any embodiment, the dispenser 112 is heated to maintain the molten state of the entrained polymer and to facilitate precise formation of the entrained polymer into the predetermined shape in the dispensing step. Optionally, in any embodiment, the apparatus 100 is incrementally heated such that the dispensed molten entrained polymer is in a heated and pliable state (in the form of a hot melt with inherent adhesive properties) in the dispensing step to facilitate controlled and variable dispensing onto the substrate 114. This may be achieved, for example, through heating the hoses and/or dispenser, as described above. Optionally, in any embodiment, the dispenser 112 is configured to be adaptable (e.g., with replacement heads) to dispense a variety of entrained polymer shapes and material volumes from a single material source as needed.

Optionally, in any embodiment, to integrate the method of the disclosed concept into a processing line, the molten entrained polymer material may be conveyed into a metering pump supplying the heated hoses and the use of pneumatically controlled dispensers to finitely control the dispensing. Optionally, processing feedback may be used to control the supply of material from the extruder to the metering pump and from the metering pump to the dispenser. For example, programmable logic controllers may be used to adjust the on/off and speed of the feeder (e.g., extruder) to maintain a supply of molten material to the metering pump(s). Optionally, a metering pump could be coupled to a manifold that would supply multiple heated hoses and dispensers.

The primary intended use of methods according to the disclosed concept are for applying a mineral entrained polymer to a compatible substrate to adhere the (initially molten and subsequently solidified) entrained polymer to the substrate via a thermal bond. However, alternative aspects of the disclosed concept may include methods for dispensing the entrained polymer to a substrate or into a compartment wherein a thermal bond is not created and alternative means of securing the entrained polymer and substrate are required. In such a case, much of the process in terms of running the material through the extruder and adaptations to the extruder equipment would be the same. However, a mechanical interlock, a tie layer between the entrained polymer and the substrate, an adhesive additive mixed into the polymer or some other means (as an alternative to a thermal bond) may be provided to secure the entrained polymer to the substrate or compartment. For example, in the electronics industry, a substrate or compartment may include electronic components and empty space surrounding the electronic components for which it is desired to provide an active material, e.g., entrained polymer. Rather than injection molding a separate part comprising an entrained polymer and then assembling such part to the substrate or compartment, methods according to an aspect of the disclosed concept would enable one to dispense and fill a desired space on a substrate or compartment with mineral entrained polymer. Such an in-line process would obviate the need for a separate assembling step. In the event the substrate or compartment surface is incompatible with the entrained polymer such that no thermal bond can be formed, a mechanical interlock or structure may be provided to secure the solidified entrained polymer in place. For example, a cover may be placed over the substrate or compartment to form an assembly, thereby retaining the entrained polymer in place.

The invention will be illustrated in more detail with reference to the following Examples, but it should be understood that the invention is not deemed to be limited thereto.

EXAMPLES

The inventors reconfigured an extruder to create an extruder assembly and developed a desiccant entrained polymer formulation to practice a method according to an optional aspect of the invention. The extruder assembly successfully extruded a mineral entrained polymer from a pellet form, conveyed the molten material through a heated hose and dispensed it out of a heated hot melt gun or dispenser to form an entrained polymer structure adhered to a foil substrate.

A typical extruder would dispense directly through a die to produce a particular shape of material, e.g., solid or hollow strands or tubes. Uniquely, an extruder assembly according to the disclosed concept, included a heated hose coupled to the exit of the extruder and a heated dispenser coupled to the dispensing end of the hoses. The lumen of the hose was heated to a temperature above the material exiting the extruder so as to maintain the entrained polymer in a molten state as the polymer was conveyed under pressure from the extruder through the hose. Closing the dispenser allowed pressure to build up in the system. Opening and closing of the dispenser allowed the material to flow in a very controlled and precise manner. The base polymer used in the formulation was compatible with a polymer coating (polymer seal layer) on the foil substrate. This allowed the molten state of the mineral entrained polymer (which was further maintained via the heated dispenser) to mix and adhere to the coated substrate, due to similar properties of the contacting materials. The result was a solidified entrained polymer structure formed and adhered onto the foil substrate.

While the invention has been described in detail and with reference to specific examples thereof, it will be apparent to one skilled in the art that various changes and modifications can be made therein without departing from the spirit and scope thereof.

What is claimed is:

1. A method for forming and adhering an entrained polymer structure to a substrate, comprising the steps of:
  a. providing a hot melt dispensing apparatus comprising an extruder for generating a flow of entrained polymer in molten form, the extruder being in fluid communication with an applicator comprising a dispenser for dispensing the entrained polymer in molten form onto the substrate, the hot melt dispensing apparatus further comprising one or more hoses, each having an internal lumen in fluid communication with an exit of the extruder to receive the flow of the entrained polymer in molten form, the lumen terminating at the applicator to which the entrained polymer in molten form is conveyed, the entrained polymer in molten form comprising a base polymer, a mineral active agent and a channeling agent;
b. positioning the substrate, which is in solid form, beneath the dispenser; and
c. once step (b) has occurred and while the substrate is beneath the dispenser, dispensing from the dispenser the entrained polymer in molten form in a predetermined shape onto a surface of the substrate, to form thereon, upon sufficient cooling, a solidified entrained polymer structure, the solidified entrained polymer structure being a monolithic material, wherein the surface of the substrate is compatible with the entrained polymer so as to thermally bond therewith and adhere thereto upon formation of the solidified entrained polymer structure without use of a separate adhesive, the dispenser comprising a valve that alternates between a closed state and an open state so as to precisely form the entrained polymer structure in the predetermined shape and to enable the dispenser to repeat the dispensing step, in an automated manner, so as to form additional entrained polymer structures, each of which is in the predetermined shape, wherein each solidified entrained polymer structure comprises passages formed of the channeling agent that penetrate through the base polymer.

2. The method of claim 1, wherein the substrate is a foil and the surface of the substrate is a polymer sealing layer on the foil.

3. The method of claim 1, wherein the entrained polymer in molten form is conveyed through the lumen prior to step (c) and the lumen is heated to maintain a molten state of the entrained polymer in molten form when conveyed through the lumen.

4. The method of claim 1, wherein the dispenser is heated to maintain a molten state of the entrained polymer in step (c) and to facilitate precise formation of the entrained polymer into the predetermined shape in step (c).

5. The method of claim 1, wherein the active agent comprises a molecular sieve desiccant, a silica gel desiccant, or a clay desiccant.

6. The method of claim 1, wherein the entrained polymer structure is in the form of a strip of film.

7. The method of claim 6, the strip of film having a thickness of from 0.1 mm to 1.0 mm.

8. The method of claim 7, wherein the substrate is a foil, the surface of the substrate is a polymer sealing layer on the foil, and the substrate is a portion of a package for a moisture-sensitive product.

9. The method of claim 1, wherein the method is carried out as part of an automated, in-line package production process.

10. The method of claim 1, wherein the active agent is from 30% to 80% by weight of the entrained polymer.

11. The method of claim 1, wherein at least some of the passages formed of the channeling agent are interconnected with each other.

12. The method of claim 1, wherein the substrate is a foil and the surface of the foil comprises a polymer sealing layer, the active agent being from 30% to 80% by weight of the entrained polymer, the active agent comprising a molecular sieve desiccant, a silica gel desiccant or a clay desiccant.

13. The method of claim 12, wherein the channeling agent is a polymer and is from 2% to 12% by weight of the entrained polymer.

14. A method for repeatedly forming and adhering precisely shaped entrained polymer structures to a substrate in an automated package production line, the method comprising the steps of:
a. extruding an entrained polymer composition in molten form using an extruder of a hot melt dispensing apparatus, the extruder being in fluid communication with an applicator comprising a dispenser for dispensing the entrained polymer composition in molten form onto the substrate, the hot melt dispensing apparatus further comprising one or more hoses, each having an internal lumen in fluid communication with an exit of the extruder to receive the flow of the entrained polymer composition in molten form, the lumen terminating at the applicator to which the entrained polymer composition in molten form is conveyed, wherein the entrained polymer composition comprises a mixture of a base polymer and a mineral active agent;
b. advancing the substrate in a first direction so as to position the substrate, which is in solid form, beneath the dispenser, the substrate having a surface comprising a polymer sealing layer for receiving application of the entrained polymer composition;
c. while the substrate is beneath the dispenser, depositing the entrained polymer composition in molten form in a predetermined shape onto the surface of the substrate, wherein the predetermined shape of entrained polymer composition in molten form adheres to the polymer sealing layer by thermal bonding, forming an entrained polymer structure in a precise shape upon cooling and solidification of the entrained polymer composition; and
d. repeating steps (b) and (c) so as to form and adhere additional entrained polymer structures, each in the precise shape, to the substrate in the automated package production line;
wherein the entrained polymer composition in molten form is conveyed through the lumen prior to step (c) and the lumen is heated to maintain a molten state of the entrained polymer composition when conveyed through the lumen, wherein the dispenser in step (c) is heated to maintain a molten state of the entrained polymer composition and to facilitate precise formation of the entrained polymer composition into the predetermined shape in step (c), the dispenser comprising a valve that alternates between a closed state and an open state so as to precisely and repeatedly form each entrained polymer structure in the predetermined shape.

15. A method for repeatedly forming and adhering precisely shaped entrained polymer structures to a substrate in an automated package production line, the method comprising the steps of:
a. extruding an entrained polymer composition in molten form using an extruder of a hot melt dispensing apparatus, the extruder being in fluid communication with an applicator comprising a dispenser for dispensing the entrained polymer composition in molten form onto the substrate, the hot melt dispensing apparatus further comprising one or more hoses, each having an internal lumen in fluid communication with an exit of the extruder to receive the flow of the entrained polymer composition in molten form, the lumen terminating at the applicator to which the entrained polymer composition in molten form is conveyed, wherein the entrained polymer composition comprises a mixture of a base polymer and a mineral active agent;

b. advancing the substrate in a first direction so as to position the substrate, which is in solid form, beneath the dispenser, the substrate having a surface comprising a polymer sealing layer for receiving application of the entrained polymer composition;

c. while the substrate is beneath the dispenser, depositing the entrained polymer composition in molten form in a predetermined shape onto the surface of the substrate, wherein the predetermined shape of entrained polymer composition in molten form adheres to the polymer sealing layer by thermal bonding, forming an entrained polymer structure in a precise shape upon cooling and solidification of the entrained polymer composition; and d. repeating steps (b) and (c) so as to form and adhere additional entrained polymer structures, each in the precise shape, to the substrate in the automated package production line;

wherein the dispenser comprises a valve that alternates between a closed state and an open state so as to precisely and repeatedly form each entrained polymer structure in the predetermined shape.

16. The method of claim 15, wherein the substrate is a foil and the surface of the foil comprises a polymer sealing layer, the active agent being from 30% to 80% by weight of the entrained polymer composition, the active agent comprising a molecular sieve desiccant, a silica gel desiccant or a clay desiccant, wherein the entrained polymer structure adheres to the substrate without use of a separate adhesive material.

17. The method of claim 16, the entrained polymer composition comprising a polymer channeling agent that is from 2% to 12% by weight of the entrained polymer composition, each entrained polymer structure comprising passages formed of the channeling agent that penetrate through the base polymer.

18. The method of claim 16, wherein each predetermined shape of entrained polymer composition in molten form is provided in the same amount and configuration as another so as to render each entrained polymer structure to be the same size and shape as another.

19. The method of claim 18, wherein each entrained polymer structure is in the form of a film having a thickness of from 0.1 mm to 1.0 mm.

20. The method of claim 19, wherein the substrate is used as a portion of a flexible package, a pouch or a blister pack.

21. The method of claim 20, wherein the entrained polymer composition in molten form is conveyed through the lumen prior to step (c) and the lumen is heated to maintain a molten state of the entrained polymer composition when conveyed through the lumen, wherein the dispenser in step (c) is heated to maintain the molten state of the entrained polymer composition and to facilitate precise formation of the entrained polymer composition into the predetermined shape in step (c).

* * * * *